United States Patent [19]

Bereskin et al.

[11] 4,145,286

[45] Mar. 20, 1979

[54] AUTOMATIC SYSTEM FOR TRAPPING AND REMOVING WASTE HYDROCARBONS FROM WATER

[76] Inventors: Fred P. Bereskin, 117 Red Oak La., Highland Park, Ill. 60035; Joseph J. Borowczyk, 116 West Central Blvd., Villa Park, Ill. 60181

[21] Appl. No.: 820,553

[22] Filed: Aug. 1, 1977

[51] Int. Cl.² .......................... B01D 21/24; B03D 3/00
[52] U.S. Cl. ..................................... 210/104; 210/540
[58] Field of Search ...................... 210/96 A, 104, 540, 210/DIG. 25

[56] References Cited

U.S. PATENT DOCUMENTS

| | | | |
|---|---|---|---|
| 2,330,508 | 9/1943 | McColl | 210/DIG. 25 |
| 2,984,360 | 5/1961 | Smith | 210/104 |
| 3,348,690 | 10/1967 | Cornelissen | 210/DIG. 25 |
| 3,721,344 | 3/1973 | Rost | 210/104 |
| 3,731,802 | 5/1973 | James | 210/540 X |
| 3,894,949 | 7/1975 | Einzmann | 210/540 X |
| 3,907,682 | 9/1975 | Basseet | 210/540 X |
| 3,971,719 | 7/1976 | Peters | 210/540 X |
| 4,031,007 | 6/1977 | Sierra, Jr. | 210/96 R |

Primary Examiner—John Adee
Attorney, Agent, or Firm—Robert E. Wagner; Gerald T. Shekleton

[57] ABSTRACT

The subject invention comprises systems for the automatic removal of waste hydrocarbons from water. Waste water enters a primary vessel through a baffled inlet chamber, allowing solids to fall to the bottom of a main collection chamber as the waste hydrocarbons float upwardly on the water in this chamber. The separated water flows out of the chamber into the sewer system or other discharge areas. When the oil level in the primary vessel reaches a predetermined level, a control system allows water to enter the bottom of the main collection chamber, closes off the normally open water discharge outlet. The entering water forces the waste hydrocarbon level upwardly, until gravity forces the waste hydrocarbons out the waste discharge outlet into a storage vessel. When the waste is completely discharged, normal waste waste flow-through is resumed. Upon filling the storage vessel with waste hydrocarbons, all operations are suspended until the stored hydrocarbons are pumped out.

7 Claims, 3 Drawing Figures

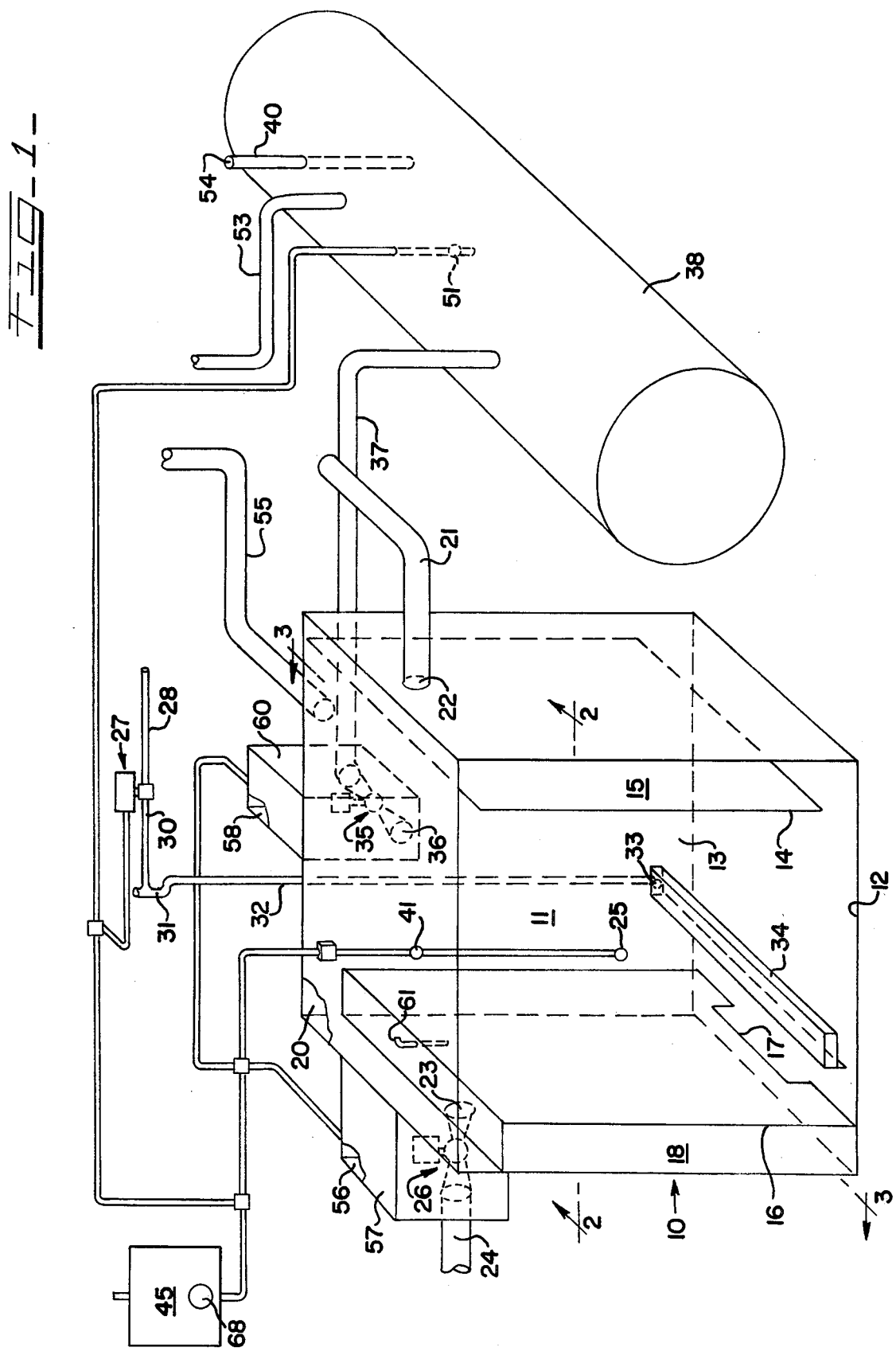

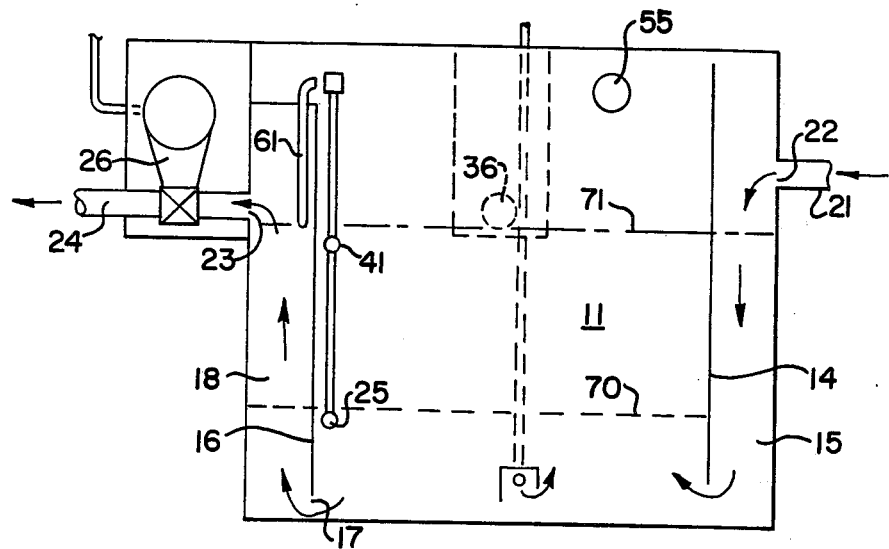
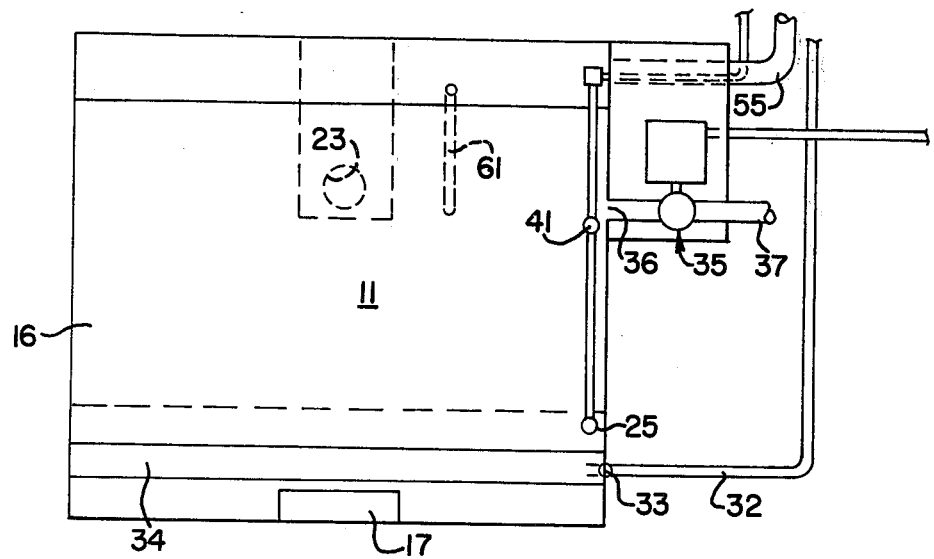

AUTOMATIC SYSTEM FOR TRAPPING AND REMOVING WASTE HYDROCARBONS FROM WATER

BACKGROUND OF THE INVENTION

This application relates to the purification of waste water and, more particularly, to the removal of oil, grease and other hydrocarbons from water prior to discharge into the sewer system.

Much attention and research has been focused on preventing the contamination of sewer systems by the discharge of waste hydrocarbons. Different mechanical arrangements, such as triple basins and oil traps, have been tried and found wanting, being somewhat ineffective due to an inadequate supply of the necessary flotation materials in some areas where these devices have been employed. For instance, in U.S. Pat. No. 2,330,508 to McColl, there is disclosed a system for removing oil films from bodies of water. McColl draws the oil-water mixture into a settling tank where both water and oil may be withdrawn independently of the other. U.S. Pat. No. 2,876,903 to Lee teaches an oil skimmer vessel which will discharge the water separated from the oil, but not the oil. Thus, it can be seen that there has frequently been a lack of appropriate safeguards for alerting supervisory personnel when such devices have reached their capacity and should be emptied. Since a full trap or basin will spill the pollutant into the sewer system and contaminate the water supply, the need arises for a method or system by which a trap may be tended automatically, without the need for constant monitoring of the pollutant level.

It is therefore a primary objective of the present invention to provide an improved system for preventing entry of waste hydrocarbons into the sewer system.

An important object of the invention is the provision of a control system for effecting an automatic hydrocarbon removal cycle, obviating the need for intervention by personnel during a routine removal cycle.

A still further object is a system which will allow a substantially continuous flow of waste water into the system prior to, during, and after each removal operation.

SUMMARY OF THE INVENTION

A system for waste oil recovery by flotation constructed in accordance with the present invention includes a main collection chamber for receiving influent waste water including oil, grease and other hydrocarbons, so that the hydrocarbons, having a lesser specific gravity than water and immiscible in water, will float, becoming an upper layer, the water settling in the chamber to become a lower layer.

A water outlet regulates discharge of the water from the main collection chamber to keep the water at a desired level. A waste outlet regulates discharge of the hydrocarbons from a discharge opening or vent which is at a higher level or height than the water outlet in the main collection chamber.

It is necessary that the upper hydrocarbon layer maintains a substantially distinct interface with the water layer. Of course, any heavy minerals insoluble in the water or hydrocarbon layer will sink to the bottom of the chamber. The waste opening is at a height no lower than the water level, and preferably immediately above the water level. In addition, a second water inlet regulates the admission of water under pressure into the lower portion of the collection chamber to raise the hydrocarbon layer to the discharge opening when the water is admitted. In accordance with the present invention, a control means is provided for automatically initiating the waste removal cycle by controlling the outlet and inlet opening to admit fluid to raise the waste level and discharge and waste hydrocarbons through the discharge opening. The waste removal cycle is then automatically terminated and the collection chamber is returned to a normal flow-through operation. Another feature of the invention is a holding or storage tank for receiving the hydrocarbons removed from the main collection chamber during the removal cycle.

DESCRIPTION OF THE DRAWINGS

In the several figures of the drawings, like reference numerals identify like components, and in those drawings:

FIG. 1 is a perspective view, partly broken away, depicting various components of the waste hydrocarbon recovery system of this invention; and, FIGS. 2 and 3 are sectional views, taken along the lines 2—2 and 3—3, respectively, of FIG. 1, depicting additional details of the invention.

As shown in FIG. 1, a major component of the waste oil recovery system of this invention is a primary tank 10 which includes a main collection chamber 11. This collection chamber has a floor portion 12, a back wall 13, one side wall 14, which is actually a baffle plate also defining a wall of an inlet chamber 15, and another side wall 16, having a cut-out portion 17 at its lower extremity for providing communication with a discharge chamber 18. A fluid-tight cover 20, only a portion of which is indicated, extends over the main collection chamber 11, as well as the inlet chamber 15 and discharge chamber 18.

The main path for movement of material through the system includes waste water conduit 21, which communicates at the inlet opening 22 with inlet chamber 15. Waste water flows from the inlet opening 22 downwardly under the lower edge of baffle plate 15 to settle in the main collection chamber 11. The waste water may come in under slight pressure or under the force of gravity from a drain or the like. The inlet opening 22 should be at a height on the tank 10 so as to be above the liquid level within the main collection chamber 11 and inlet chamber 15 at all times.

The waste water may contain a variety of waste material insoluble in water, including oil, grease and other hydrocarbons and heavy minerals. By virtue of their difference in specific gravity, the hydrocarbons will float on top in a water solution. Thus, on entering the chamber 11, the lower layer of separated water will pass through opening 17 into discharge chamber 18, to exit from the system at water outlet opening 23.

As stated, the subject invention provides an automatic waste removal cycle. The outlet means comprises an automatic valve assembly 26 between the outlet opening 23 and the water outlet conduit 24. This valve assembly 26 is normally open to allow the removal of water through the discharge chamber 18 toward the sewer or other settling region external of the primary tank. Normally closed water inlet means or valve means 27, such as a solenoid valve or the like regulates the flow of water under pressure from a supply line 28 through the valve, over line 30, past vacuum breaker 31 and downwardly through line 32 to pass through opening 33, where it enters the chamber 11 through water distribution trough 34 in a lower portion of the main collection chamber 11. A waste discharge valve 35 on the back wall 13 and located above the level of the water outlet 23 is normally closed for regulating the egress of the collected waste hydrocarbons from opening 36 through the valve 35 and waste discharge line 37 to enter a secondary storage tank 38. Those skilled in the art will appreciate that the storage tank 38 provides a convenient facility for storing the waste hydrocarbons removed in each cycle, until a sufficient volume is accumulated to warrant its removal through the waste pump-out conduit 40.

A second sensor 41 is positioned just below the static waste level (as better seen in FIG. 2) to provide a signal when this sensor detects the absence of hydrocarbons and presence of water. In short, the first sensor 25 provides the proper control signal to initiate the waste removal cycle, and the second sensor 41 thereafter provides the second signal to terminate the waste removal cycle after the waste hydrocarbons at the top of the water have been forced out the conduit 37 into the secondary vessel 38. These first and second signals are sent along suitable conductive paths, such as wires, to and from control cabinet 45, waste discharge outlet means 35, water inlet means 27, and water discharge outlet means 26.

A signal may be returned from another sensor 51 within the secondary storage tank 38 to the control means indicating that the accumulated hydrocarbons have reached a predetermined level and should be transferred to another container or for another use. An atmospheric vent may be provided for the secondary storage tank, as well as gas-tight closure cap 54 for the discharge tube 40 of this vessel.

A vent 55 on the main collection chamber 11 permits the chamber 11 to operate at atmospheric pressure at all times. In addition, gas-tight cover 56 on the chamber 57 encloses the automatic water discharge outlet means 26, and a similar gas-tight cover 58 encloses chamber 60 for the waste removal outlet means 35. Chambers 57 and 60 can be of the explosion-proof type. An air vent 61 is provided near the top of discharge chamber 18, as shown, serving to equalize the atmospheric pressure in the trap and minimize turbulence when the separated water is discharged from the chamber 18 outwardly through the conduit 24 into the sewer system.

The operation of the invention is better understood in connection with FIGS. 2 and 3 and particularly the simplified showing of FIG. 2. As entering waste water is fed, preferably by gravity, through entrance conduit 21 and opening 22, it descends downwardly through the inlet chamber 15, under baffle plate 14, and into the main collection chamber 11. There the hydrocarbon and water mixture will separate into its immiscible components. When the hydrocarbon level reaches the reference level indicated by broken line 70, a control signal is generated by a first sensor 25, to initiate the waste removal cycle. Those skilled in the art will understand the reference level 70 can be positioned by moving the first sensor 25, depending upon the physical dimensions of the total collection chamber and the amount of hydrocarbons one desires to collect before the cycle is initiated.

When the first control signal is sent to the control cabinet, the water discharge means, water inlet means, and waste discharge means of the invention are actuated from their normal positions to the energized positions. Specifically, the water control discharge means 25 is energized to a closed position, preventing any further egress of water from the discharge chamber 18 through conduit 24. At the same time, the other two valve means 27 and 35 are opened. Opening of valve 27 admits water under pressure from the supply line 28 downwardly and through the opening 33 into the water distribution through 34, where it is distributed along the length of the floor of the main collection chamber, and deflected away from the opening 17 communicating with the discharge chamber 18. In this manner, the water may be admitted in large volumes quickly without agitation of the water-hydrocarbon interface. It is preferable to the efficient operation of this invention that the interface be kept as distinct as possible.

The opening of valve 35 completes a discharge path of the waste hydrocarbons through the opening 36 and conduit 37 to the secondary storage tank 38. Thus, the pressurized or forced entry of the water through the opening 33 and the trough 34 raises the water level from reference level 70 upwardly, until it reaches the static level 71, which is even with the bottom line of the discharge conduit 24.

The second sensor 41 is disposed just below this static level, and, the discharge opening 36 for the waste hydrocarbons is just above this level. Hence, after the influx of water has forced the waste hydrocarbons upwardly and out the opening 36 to the secondary storage tank 38, the absence of hydrocarbons and the pressure of water at the second sensor 41 generates a second control signal, to terminate the waste removal cycle. That is, valve means 35 is closed to prevent further removal of the hydrocarbons, and valve means 27 is closed to shut off the supply of water under pressure. At the same time, valve 26 is again opened, completing the discharge path for the waste water. Thus, the water is again allowed to pass from the main collection chamber under the opening 17, through the discharge chamber 18, past the now-opened valve 26 into the outlet conduit 24. A completely automated waste removal cycle has been accomplished without the intervention of any attendant personnel.

Of course, it should be realized that the inventive system will operate regardless of the amount of water present in the waste water flowing into the system. Thus, should waste comprising almost entirely a nonaqueous solution of hydrocarbons enter the system through inlet 22, the incoming hydrocarbon waste would depress the water level until contact of the waste is made with sensor 25 initiating the waste removal cycle and following the sequence described above.

The use of the above-described system allows for continuous use of all drainage systems without the need for shutting down any dependent apparatus or process to allow the cleaning of the traps as by skimming or the like. The waste water influx is maintained at all times and, if the secondary storage tank 38 is properly attended to in a manner to be described, the user is assured of the complete removal of water-immiscible hydrocarbons, including oil and grease, from the waste water prior to entry to the sewage system.

It is emphasized that a considerable savings in labor is accomplished by the present invention, and that each waste removal cycle from the main collection chamber 11 is accomplished automatically and only when the accumulated waste hydrocarbons have risen to a preset level in secondary storage tank 38 is a signal generated by sensor 51 for the provision of a warning indication, such as lighting a lamp 68, and, if desired, actuating an alarm to alert maintenance personnel that the waste hydrocarbons should be removed from the secondary vessel. At this point, all systems may be rendered inoperable until removal is accomplished.

The cycle-initiation and cycle-termination signals are generated by sensors 25 and 41, each of which is a simple unit for sensing the presence or absence of water. For example, the first control signal is generated at sensor 25 as the rising level passes the reference level and the water contacts the sensor; the presence of water signal is equivalent to an absence of hydrocarbon signal. This signal initiates the waste removal cycle as described. In addition, when the hydrocarbons have been removed through the discharge opening 36, this lack of hydrocarbons, or presence of water, is sensed by sensor 41, which generates the second control signal as described. The manner of sensor operation is not intended as limiting to the invention, but it should be understood that a relationship exists in the sensor's position, the reference level 70, and the static level 71 to effect the appropriate removal of hydrocarbons without water to the secondary storage tank 38, allowing the discharge of hydrocarbon-free water through conduit 24 to a sewer system. Any solids flowing in with the waste water and not soluble in water will settle to the bottom of the main collection chamber 11, and may be collected at spaced intervals or when necessary.

In a preferred embodiment, the walls of the chambers are made of black steel plate, 3/16 or ¼ inch thick. Of course, the precise dimensions will vary with the application of each system. Fluid-tight covers are provided as described for both the large chambers and the valve maintenance chambers.

While only a particular embodiment of the invention has been described and illustrated, it is apparent that various alterations and modifications may be made therein. It is, therefore, the intention of the appended claims to cover all such modifications and alterations as may fall within the true spirit and scope of this invention.

We claim:

1. An automatic system for the recovery from water by flotation of waste such as oil, grease and other hydrocarbons, comprising:
   a main collection chamber for receiving influent material including a waste and water mixture from a first gravity feed inlet means, said waste and water mixture normally separating into an upper waste layer and a lower water layer, said chamber having a bottom;
   first outlet means disposed at a first selected height above said bottom for maintaining said water layer below a first level within said chamber;
   second outlet means disposed at a second selected height above said first height of said first outlet means, said second outlet means maintaining said waste layer below a second level within said chamber;
   second inlet means for admitting substantially clean water under pressure into said chamber including a water distribution trough for the rapid admission of the water into said chamber without undue disturbance and mixing of said upper waste layer and said lower water layer; and,
   control means for controlling the operation of said first and second outlet means and said second inlet means relative to one another to allow said lower water layer to be augmented by said water from said second inlet means to increase the level of said lower water layer to that of said second outlet and cause substantially the entire of said upper waste layer to be discharged from said chamber through said second outlet means.

2. The system of claim 1 wherein a holding tank is in communication with said chamber through said second outlet means for receiving the upper waste layer removed thereby.

3. The system of claim 1 wherein said control means includes a first sensor for sensing that the waste has increased to a predetermined volume and generating a first signal to close said first outlet means and open said second outlet means, thereby causing said water level to increase to said second level and discharge said waste out said second outlet means.

4. The system of claim 3 wherein said control system includes a second sensor, for generating a second signal to cause said second outlet means to be closed and said first outlet means to open to terminate said waste removal cycle.

5. A system for waste hydrocarbon recovery by flotation, comprising:
   a primary tank having a main collection chamber for the separation of hydrocarbons and water into a hydrocarbon stratum and a water stratum, an inlet chamber defining a passage for admitting influent waste water to said main collection chamber, a discharge chamber, and a control system for automatically initiating and terminating a waste removal cycle;
   said control system including a water discharge means for regulating the flow of the separated water from said discharge chamber;
   a water inlet means for regulating the forced admission of substantially clean water into said main collection chamber, said water inlet means including a water distribution means for the rapid admission of said water under pressure without undue disturbance of the hydrocarbon stratum and water stratum;
   a first sensor, disposed at a first selected level in main collection chamber and operable to generate a first control signal when a preset hydrocarbon depth is reached, said first control signal initiating the waste removal cycle;
   a second sensor, positioned above said first sensor at a second selected level for generating a second control signal when a preset water height is reached; and,
   a waste discharge means, whereby, upon generation of said first control signal to initiate said waste removal cycle, said water discharge means is closed and said waste discharge means and said water inlet means are opened, thereby admitting water under pressure to rapidly raise said waste stratum upwardly for removal through said waste discharge means, said water thereby reaching said second selected level and causing said second sensor to generate said second control signal, thereby opening said water discharge means and closing said waste discharge means and said water inlet means, to terminate said waste removal cycle.

6. The system of claim 5 wherein a secondary vessel communicates with said waste discharge conduit for the reception of waste when said waste discharge means is open.

7. The system of claim 5 wherein said water inlet means includes a water distribution trough located in a lower portion of said main collection chamber, said trough being adapted to deflect the incoming water in a direction away from said discharge chamber.

* * * * *